United States Patent Office 2,925,432
Patented Feb. 16, 1960

2,925,432
4,4-DIFLUORO-3-BUTEN-1-YNE AND METAL SALTS THEREOF

John J. Drysdale, Wilmington, Del., assignor to E. I. du Pont de Nemours and Company, Wilmington, Del., a corporation of Delaware No Drawing. Application October 12, 1956
Serial No. 616,113

8 Claims. (Cl. 260—431)

This invention relates to the production of 4,4-difluoro-3-buten-1-yne and metal salts thereof and to the novel compounds produced thereby.

Fluorine compounds containing olefin unsaturation have achieved considerable technical importance in recent years. They form the basis of a series of polymers and copolymers which have high resistance to chemical attack and display unusual thermal stability.

It is an object of the invention to prepare fluorine compounds containing both olefin and acetylene linkages which can serve as reactive intermediates for the preparation of new and unusual compounds and polymers.

The compounds of the invention have the general formula

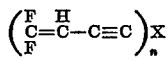

where X is selected from the group consisting of hydrogen and groups I and II metals, and n is a whole number whose numerical value is the same as the chemical valence of X. Metals of groups IB and IIB of the periodic table are the preferred metals because of the ease of preparation of these organometallic compounds.

4,4-difluoro-3-buten-1-yne is a colorless gas at ordinary temperatures which condenses to a colorless liquid when immersed in a solid carbon dioxide-acetone solution. It boils at −2° to +2° C. and is soluble in alcohol, dioxane and acetone. The compound can be stored at 5° C. or lower in sealed glass containers from which the oxygen has been displaced with an inert gas, such as nitrogen, without polymerizing or decomposing. Preferably a trace of hydroquinone or other oxygen scavenger is added to the compound prior to storage.

The metal salts of this compound are solids whose colors range from white to yellow. The salts are stable at room temperature but turn dark when exposed to air and light. They are readily soluble in oxygenated organic solvents such as alcohol and are partially soluble in aromatic hydrocarbons such as benzene. Care must be exercised in handling the dry salts since they are frequently sensitive to shock and heat.

The novel method of preparing 4,4-difluoro-3-buten-1-yne is by pyrolyzing 1-ethynyl-2,2,3,3-tetrafluorocyclobutane. In the pyrolysis reaction a minor amount of the cyclobutane derivative s also cleaved to form tetrafluoroethylene and monovinylacetylene.

The ethynyl tetrafluorocyclobutane which is the starting material for our novel process, in prepared by reacting tetrafluoroethylene with monovinylacetylene as described by Coffman, Barrick, Cramer and Raasch, J. Am. Chem. Soc., 71, 496 (1949). The ethynyl tetrafluorocyclobutane is conveniently pyrolyzed by passing it through a reaction zone heated to a temperature of about 600–1000° C. For ease of operation and to insure the highest yield of desired product the preferred pyrolysis temperature lies between 750° and 900° C. The pyrolysis is preferably conducted in an atmosphere substantially free of oxygen.

The pressure at which the pyrolysis of the ethynyl tetrafluorocyclobutane is conducted is not critical. Pressures ranging from a few microns of mercury to atmospheric or even super atmospheric pressures are operable. In general, it is preferred to use pressures of less than 50 mm. of mercury in order to get the reaction product out of the reaction zone as rapidly as possible and to avoid formation of undesirable by-products.

The flow rate of the ethynyl tetrafluorocyclobutane through the reaction zone is not critical. It is only necessary to heat the ethynyl tetrafluorocyclobutane to the reaction temperature for a short time to obtain the desired cleavage of the cyclobutane ring. The rate of gas flow through the reactor is greater at lower pressures. Consequently, the shortest contact times of reactants in the reaction zone are obtained at lowest operating pressures.

The reactor can be constructed of any inert heat-resistant material. It can be made, for example, of quartz, heat-resistant glass or stainless steel. The reactor can be packed with inert materials such as granular quartz to provide better heat transfer. Metals or other materials which react with the ethynyl tetrafluorocyclobutane should not be used. The reaction zone can be heated by conventional means. Electric heaters are very satisfactory for this purpose. Pyrolysis may be effected over glowing metal filaments such as platinum.

The ethynyl tetrafluorocyclobutane is added dropwise to the inlet end of the reactor at a rate which is determined by the size and shape of the tube and by the amount of material to be pyrolyzed. The products of pyrolysis pass from the exit end of the tube and are collected in a series of traps cooled with liquid nitrogen. The crude product can be partially purified by fractional distillation to obtain a material composed of approximately 85% 4,4-difluoro-3-buten-1-yne and 15% monovinylacetylene. Final purification can be accomplished by the procedure used in vapor phase chromatography.

The following examples in which quantities are given as parts by weight serve to illustrate the methods used to prepare the novel products of the invention.

Example 1

A "Vycor" (quartz-like material) pyrolysis tube, 1" in diameter and 24" long, is packed with quartz tubes (6 mm. x 6 mm.) and suspended vertically in a furnace so that approximately 13" of the tube is inside the furnace. A fitting at the top of the tube permits introduction of nitrogen and is also used to introduce the material to be pyrolyzed. The tube is heated to 800° C., flushed with nitrogen gas and evacuated to a pressure of 1.5 mm. of mercury. A total of 118 parts of 1-ethynyl-2,2,3,3-tetrafluorocyclobutane is added dropwise through the top of the tube at the rate of 1 part per minute. After all the material has passed through the pyrolysis tube, the crude product in the traps, approximately 100 parts, is distilled into a low temperature fractional distillation unit. Careful fractional distillation of the crude product in a low temperature distillation unit yileds 38 parts of material boiling at −2° to +2° C. which is shown by infrared absorption and nuclear magnetic resonance spectra to contain about 85% 4,4-difluoro-3-buten-1-yne. The product is purified further as follows:

A six-foot stainless steel column $\frac{3}{16}$" inside diameter, is packed with a composition containing 75% by weight of "Celite" 545 and 25% di-n-octyl phthalate. Helium gas is passed through the column at a rate of 18 to 18.5 cc./minute at 24° C., giving a back pressure of 13.9 cm. A volume of 0.25 cc. 4.4-difluoro-3-buten-1-yne obtained above is then admitted to the column. Under the conditions of this procedure the main component, this is, 4,4-difluoro-3-buten-1-yne, has a retention time of 9.6 minutes, the impurity has a retention time of 12.5 minutes.

The purified product from several runs on analysis contains 40.6% F.; the calculated value for $C_4H_2F_2$ is 43.2% F.

*Example 2*

A total of 210 parts of 1-ethynyl-2,2,3,3-tetrafluorocyclobutane is pyrolyzed at 800° C. and 2–4 mm. pressure in the manner described in Example 1. The pyrolysis products, boiling below 25° C., which are collected in the trap are transferred to a cold stainless steel cylinder and then to a low temperature fractional distillation unit. There is obtained approximately 40 parts of material boiling at 2° C., which is shown by nuclear magnetic resonance analysis to contain 82% of 4,4-difluoro-3-buten-1-yne and 18% monovinylacetylene.

This mixture is separated by fractional distillation in an efficient fractionating column.

*Example 3*

Approximately 3 parts of 1-ethynyl-2,2,3,3-tetrafluorocyclobutane is pyrolyzed at 750° C. and 2–4 mm. pressure in the manner described in Example 1. Infrared analysis of the pyrolysis product boiling below 25° C. shows that 4,4-difluoro-3-buten-1-yne is obtained together with tetrafluoroethylene, vinylidene fluoride and monovinylacetylene. Separation is obtained in an efficient fractionating column.

The preparation of a typical salt of 4,4-difluoro-3-buten-1-yne is described in Example 4.

*Example 4*

This example shows the preparation of the mercury derivative of 4,4-difluoro-3-buten-1-yne $$(F_2C=CH-C\equiv C)_2 Hg$$

A solution of 163 parts of potassium iodide and 66 parts of mercuric chloride is prepared in 163 parts of water. To this solution there is added 125 parts of 10% sodium hydroxide. Fifteen parts of this alkaline solution is cooled in ice and a solution of 1 part of 4,4-difluoro-3-buten-1-yne in 16 parts of ethanol is added slowly with vigorous stirring. A white crystalline compound is formed which is removed by filtration and washed with 50% aqueous ethanol. Crystallization from ethanol and from benzene yields 0.8 part of mercuric salt of 4,4-difluoro-3-buten-1-yne, M.P. 170–171° C. with decomposition. Analytical data are:

Calculated for $C_8H_2F_4Hg$: Hg, 53.5%; F, 20.3%. Found: Hg, 54.4%; F, 23.8%.

The mercury salt, which is white originally, gradually becomes tan colored on storage in a closed glass container.

The silver salt is prepared by adding a solution of the fluorine-containing acetylene compound in ethanol to a cold aqueous dilute solution of silver nitrate. The salt has the formula, $CF_2=CH-C\equiv CAg$, and initially is white but turns dark on standing.

Other salts which are prepared are the lithium salt, $CF_2=CH-C\equiv CLi$; the sodium salt $$CF_2=CH-C\equiv CNa$$

the potassium salt, $CF_2=CH-C\equiv CK$; the calcium salt, $(CF_2=CH-C\equiv C)_2Ca$; and the barium salt $$(CF_2=CH-C\equiv C)_2Ba$$

4,4-difluoro-3-buten-1-yne is a versatile and reactive compound which can be readily converted, as shown above, to metal salts and other useful compounds. It can be chlorinated to yield 3,4-dichloro-4,4-difluorobutyne and brominated to yield 3,4-dibromo-4,4-difluorobutyne. It can be polymerized alone or in combination with other polymerizable monomers, for example, styrene or methyl methacrylate, by heating with a free radical catalyst, e.g., benzoyl peroxide.

Its salts are useful for improving the combustion characteristics of fuels for internal combustion engines. To illustrate specifically, the mercury salt of Example 4, when added in the proportion of 1 gm. per gallon to gasoline which contained 2 cc. of tetraethyl lead per gallon, increased the autoignition delay time of the gasoline by 12.5%. In this test a clear commercial lead-free gasoline was used which contained 24% olefins, 16% aromatics, 56% paraffins, 4% cycloparaffins and 0.05% sulfur. The test was conducted in a stainless steel ignition chamber at 550° C. Ignition delay times were measured in time units of sixtieths of a second. The following autoignition delay times, expressed in units of sixtieth seconds were obtained:

Standard untreated fuel_____ 95
Fuel with 2 ml. tetraethyl lead per gallon_____ 208
Fuel with 2 ml. tetraethyl lead and 1 gm. mercury salt of 4,4-difluoro-3-buten-1-yne per gallon_____ 234

The mercury salt enhances the effectiveness of tetraethyl lead in delaying the autoignition time of the fuel and permits the production of high antiknock fuels with minimum lead content.

The compounds of this invention, particularly the salts, are useful as bactericides, i.e., in decreasing and in preventing the growth of bacteria. To illustrate specifically, the mercury salt of Example 4 inhibits the growth of the bacteria *Micrococcus pyogenes* var. *aureus*, H strain, and *Escherichia coli*, strain 6A, as shown by the results described in the following paragraph.

The following precedure was used for testing the antibacterial action of the mercury salt of Example 4. Selected test bacteria were grown in 2% tryptose broth for 18–24 hours at 37° C. The test organism was then inoculated into melted 2% tryptose agar. This was poured into sterile Petri plates and allowed to harden. Paper discs of sterile ½" diameter filter paper were then impregnated with 0.1 ml. of a solution of 50 mg. of the mercury salt of Example 4 in 5 ml. of acetone. The discs after drying to remove the acetone contained 1000 micrograms of compound. The paper discs were then placed on the surface of the inoculated agar plates and the plates incubated at 37° C. for 18 to 24 hours. The width of the zone of inhibition of bacterial growth surrounding the paper disc was measured. This zone corresponds to the absence of all growth of the test organism and indicates that the test compound inhibits bacterial growth. The zones of inhibition for the treated discs were, for *Micrococcus pyogenes* var. *aureus*, 38 mm.; for *Escherichia coli*, strain 6A, approximately 70 mm. For untreated paper discs the zone of inhibition is zero.

I claim:

1. A method for preparing 4,4-difluoro-3-buten-1-yne which comprises subjecting 1-ethynyl-2,2,3,3-tetrafluorocyclobutane to pyrolysis, at a temperature of from about 600 to 1000° C.
2. 4,4-difluoro-3-buten-1-yne.
3. A group I metal salt of 4,4-difluoro-3-buten-1-yne.
4. A group II metal salt of 4,4-difluoro-3-buten-1-yne.
5. A mercury salt of 4,4-difluoro-3-buten-1-yne.
6. A method for preparing the compounds of claim 3 which comprises reacting a member of the group consisting of group I metal chlorides and nitrates with 4,4-difluoro-3-buten-1-yne.
7. A method for preparing the compounds of claim 4 which comprises reacting a member of the group consisting of group II metal chlorides and nitrates with 4,4-difluoro-3-buten-1-yne.
8. Compounds having the general formula $$\left(\begin{matrix}F & H \\ C=C \\ F\end{matrix}-C\equiv C\right)_n X$$

where X is selected from the group consisting of hydrogen and groups I and II metals, and $n$ is a whole number whose numerical value is the same as the chemical valence of X.

(References on following page)

References Cited in the file of this patent

UNITED STATES PATENTS

| | | |
|---|---|---|
| 1,963,935 | Carothers et al. | Jun. 19, 1934 |
| 2,082,568 | Carothers et al. | Jun. 1, 1937 |
| 2,623,077 | Croxall et al. | Dec. 23, 1952 |
| 2,686,207 | Crane et al. | Aug. 10, 1954 |
| 2,733,278 | Anderson | Jan. 31, 1956 |
| 2,773,089 | Anderson | Dec. 4, 1956 |

OTHER REFERENCES

Coffman et al.: Jour. Am. Chem. Soc., vol. 71, page 496, February 1949.

Rochow et al.: The Chemistry of Organometallic Compounds, John Wiley & Sons, Inc., New York, 1957, page 58.